(12) United States Patent
de Garrido et al.

(10) Patent No.: US 6,512,550 B1
(45) Date of Patent: Jan. 28, 2003

(54) MOTION COMPENSATED DE-INTERLACING

(75) Inventors: Diego P. de Garrido, Palo Alto, CA (US); Kamil Metin Uz, Los Altos, CA (US); Leslie D. Kohn, Fremont, CA (US); Didier LeGall, Los Altos, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/965,948

(22) Filed: Sep. 28, 2001

Related U.S. Application Data

(63) Continuation of application No. 09/342,842, filed on Jun. 29, 1999.

(51) Int. Cl.[7] .............................................. H04N 11/00
(52) U.S. Cl. ...................................... 348/452; 348/448
(58) Field of Search ................................ 348/452, 448, 348/699

(56) References Cited

U.S. PATENT DOCUMENTS

| | | | | |
|---|---|---|---|---|
| 5,208,667 A | * | 5/1993 | Saunders | 348/452 |
| 5,475,438 A | * | 12/1995 | Bretl | 348/452 |
| 5,600,377 A | * | 2/1997 | David et al. | 348/452 |
| 5,784,114 A | * | 7/1998 | Borer et al. | 348/452 |
| 6,094,232 A | * | 7/2000 | Bayazit et al. | 348/616 |
| 6,118,489 A | * | 9/2000 | Han et al. | 348/452 |
| 6,160,586 A | * | 12/2000 | Justiss et al. | 348/452 |
| 6,269,484 B1 | * | 7/2001 | Simsic et al. | 725/151 |

* cited by examiner

*Primary Examiner*—Victor R. Kostak
(74) *Attorney, Agent, or Firm*—Christopher P. Maiorana, PC

(57) ABSTRACT

A method of motion compensation using temporal support of multiple fields of video to produce a progressive frame. The moving average of the motion compensated field lines temporally adjacent to the field to be de-interlaced are used, after a non-linear filtering, as the missing lines to complete the progressive video frame.

19 Claims, 9 Drawing Sheets a = A
b = (A+B+1)/2
c = (A+C+1)/2
d = (A+B+C+D+2)/4

◯ Interger pel position      ▨ Half pel position

MOTION COMPENSATED DE-INTERLACING

This is a continuation of U.S. Ser. No. 09/342,842 filed Jun. 29, 1999.

BACKGROUND OF THE INVENTION

This invention relates to motion-compensated de-interlacing.

Traditional television systems use 2:1 vertical sub-sampling interlaced scanning. Interlacing causes artifacts, such as flicker, shimmering, and diagonal edge effects. The artifacts can be reduced by transforming the interlaced fields to progressive frames. FIG. 1 shows two interlaced frames in which the fields have temporal relationships suggested by the names top_field_first and bottom_field_first.

In FIG. 2, the input of the de-interlacer is an alternating sequence of top and bottom fields of successive frames and the output of the de-interlacer for each pair of input fields are two progressive frames that represent the same image as the input fields but at higher vertical resolution.

Mathematically, the output frame of the de-interlacer is defined as $$f_o(n_x, n_y, n_t) = \begin{cases} f_{\text{top\_field}}(n_x, \frac{n_y}{2}, n_t) & \text{with } n_y \bmod 2 = 0 \\ f_i(n_x, n_y, n_t) & \text{otherwise} \end{cases}$$

$$f_o(n_x, n_y, n_t) = \begin{cases} f_{\text{bottom\_field}}(n_x, \frac{n_y}{2}, n_t) & \text{for } n_y \bmod 2 = 1 \\ f_i(n_x, n_y, n_t) & \text{otherwise} \end{cases}$$

where $f_o$ denotes an output progressive frame for the respective input interlaced field (top or bottom), f denotes the current input field (top or bottom) to be de-interlaced, $f_i$ denotes an interpolated field of line samples to be merged with the lines of the input field, $n_x$, $n_y$ designates the spatial position, i.e., the sample position along a line and the line in the field, and $n_t$ designates the field number. The top equation applies to input top fields and the bottom equation to input bottom fields.

De-interlacing doubles the vertical-temporal sampling density and aims at removing the vertical-temporal alias caused by the interlacing process. Unhappily, the de-interlacing process does not follow the conventional linear sampling rate theory because TV cameras do not perform a vertical-temporal low-pass filtering operation before sub-sampling the video signal into the odd-even vertical-temporal sampling pattern.

One simple way to de-interlace an input field is to vertically interpolate the missing samples in the incoming field. This approach yields blurred edges, does not eliminate temporal aliasing, and can produce line jittering in the resulting frames. Yet vertical interpolation may be used as a fallback mechanism when more sophisticated de-interlacing fails to produce a frame or a part of a frame with acceptable quality.

De-interlacing using motion compensation tries to interpolate in the direction of motion trajectory. Motion compensation thus potentially permits converting a moving scene into a stationary one. Motion-compensated de-interlacing produces an optimum de-interlacing strategy for motion that has a constant and linear velocity. There are several known ways to include motion compensation in de-interlacers.

SUMMARY

In general, the invention features a method for use in adding data to an incomplete source video field that is part of a temporal sequence of fields of video data. Intermediate sets of motion compensation vectors are derived that characterize motion occurring between the source video field and each of four other fields of video data in the temporal sequence. The intermediate sets of motion compensation vectors are processed to obtain a smaller number of final sets of motion compensation vectors. The final sets of motion compensation vectors are used to predict data to be added to the incomplete source video field.

Other advantages and features will become apparent from the following description and from the claims.

DESCRIPTION

THE VERTICAL SPATIAL INTERPOLATION FILTER

A suitable vertical spatial interpolation filter for use with the motion compensated de-interlacing to be described below is in the form of a 13-tap cubic convolution low-pass filter based on the design algorithm found in R. Keys, "Cubic Convolution Interpolation for Digital Image Processing," *IEEE Transactions on Acoustics, Speech, and Signal Processing,* vol. 29, no. 6, pp. 1153–1160, December 1981.

Figure 1:
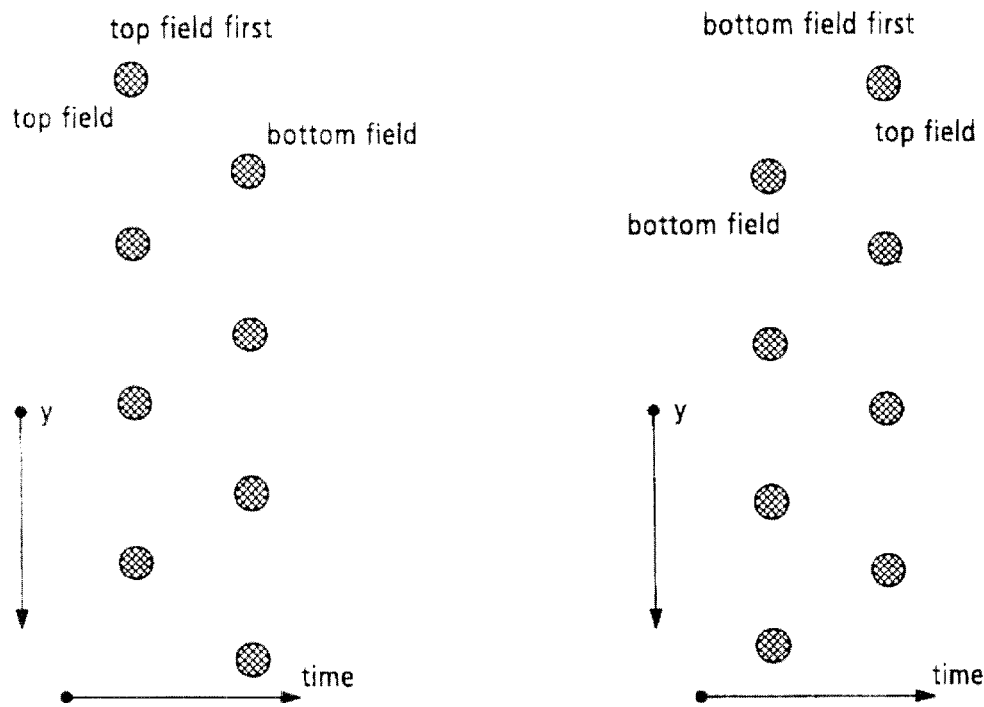
FIG. 1 shows fragments of video fields.
Figure 2:
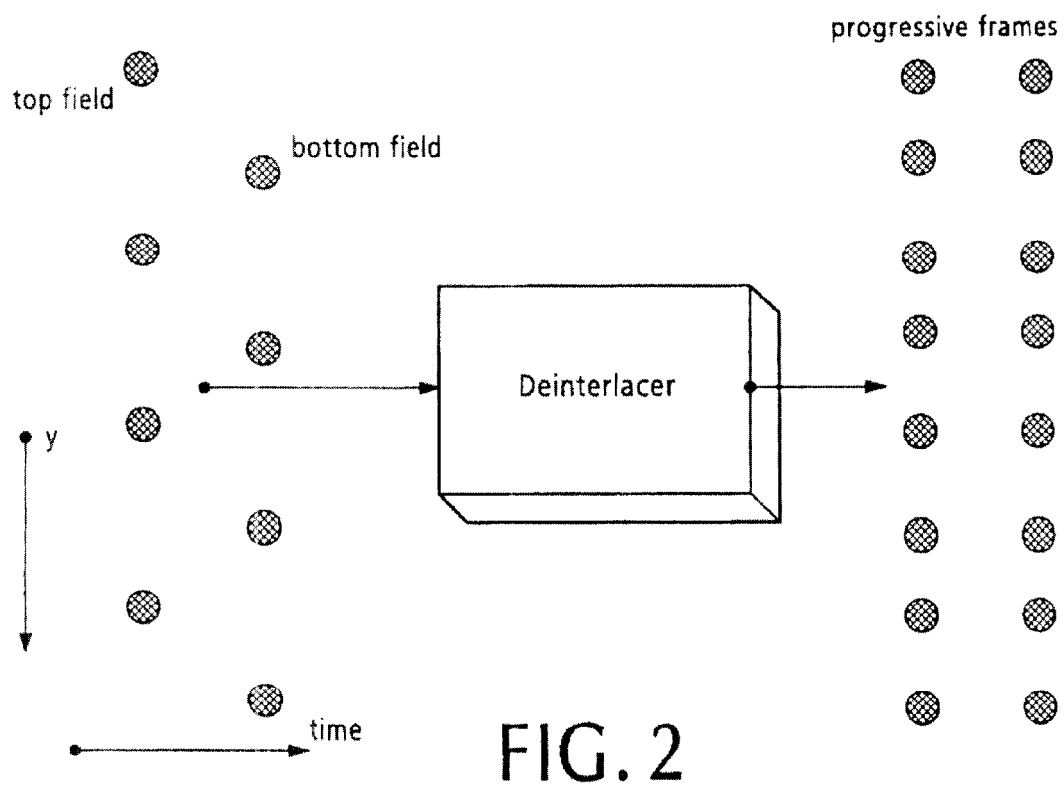
FIG. 2 shows a de-interlacing process.
Figure 3:
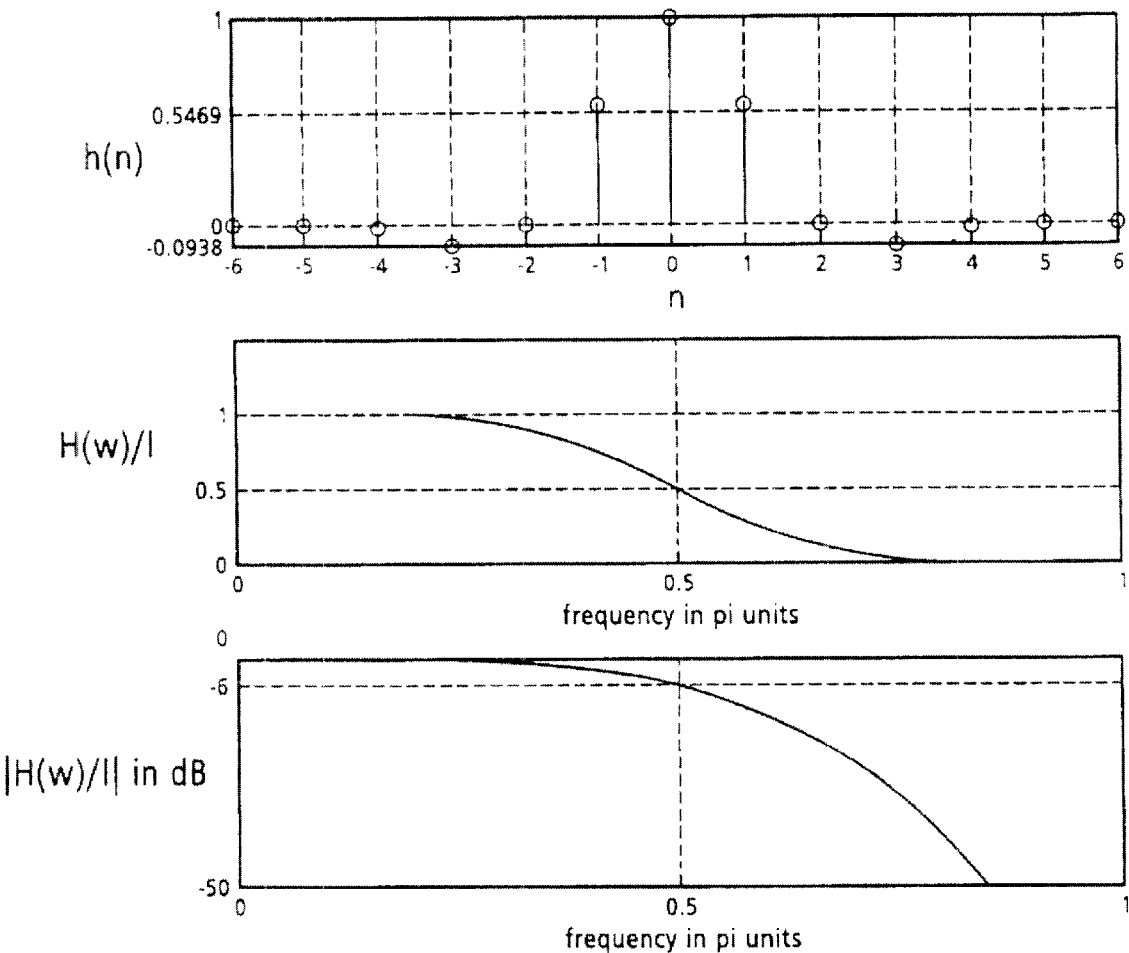
FIG. 3 shows filter characteristics.

FIG. 3 shows the impulse response, the magnitude response, and the attenuation in dB of this filter. The following table shows the impulse response values.

| h (0) | h (1) | h (2) | h (3) | h (4) | h (5) | h (6) |
|---|---|---|---|---|---|---|
| 1.00000000 | 0.58333333 | 0.00000000 | −0.09375000 | 0.00000000 | 0.01041667 | 0.00000000 |

The impulse response is symmetric in relation to the central filter tap. Because the goal is to line double the input field, the cutoff frequency is set at $w_c = \pi/2$. At this frequency, the attenuation is approximately 6 dB. This kernel is a Nyquist filter for which h(n) has periodic zero-crossings separated by two samples, except that h(0)=1.

As the interpolation filter inserts new samples, the existing samples are fed to the output without distortion. For an efficient implementation of the interpolation process using linear convolution, the filter should be decomposed into two polyphases, one that is a constant equal to 1 and the other $g(n)=h(2n+1)$. Using this approach, the interpolated frame can be written as:

$$f_l(n_x, n_y, t) = \sum_{k=-3}^{2} f_{\text{top or bottom}}(n_x, n_y - k, n_t) g(n_y)$$

De-interlacing Using Motion-compensation

We now describe a useful de-interlacing algorithm that has several stages: motion estimation, vector field post-processing, and motion compensation for de-interlacing.

Motion Estimation for De-interlacing

The motion estimation uses block-based algorithms that can be implemented on a processor chip that has full search block motion estimation capability. Block-based motion estimating algorithms are described in a comprehensive way in A. M. Tekalp, *Digital Video Processing*, Englewood Cliffs, N.J.: Prentice-Hall, 1995; with earlier works in A. N. Netravali and J. D. Robbins. *Motion-Compensated Television Coding: Part I*, BSTJ, 58(3):631–670, March 1979; and A. N. Netravali and J. A. Stuller, *Motion-Compensated Television Coding: Part I*, BSTJ, 58(7):1703–18, September 1979.

The motion estimation uses hierarchical block matching in which full-search block motion estimation is performed in a reference field having lower spatial resolution than the input field. A low-pass pyramid representation is constructed for the reference field and the input field using the following equation, where $f_l$ denotes the field in the $l^{th}$ coarse resolution, L represents the number of coarse representations in the hierarchy, and $h[i][j]$ denotes the filter coefficients with I and J denoting the number of filter taps.

$$f_l(n_x, n_y, n_t) = \left( \sum_{i=0}^{I-1} \sum_{j=0}^{J-1} h[i][j] \times f_{l-1}\left(2n_x + i - \frac{I-1}{2}, 2n_y + j - \frac{J-1}{2}, n_t\right) \right),$$

$$1 \leq l \leq L$$

Figure 4:
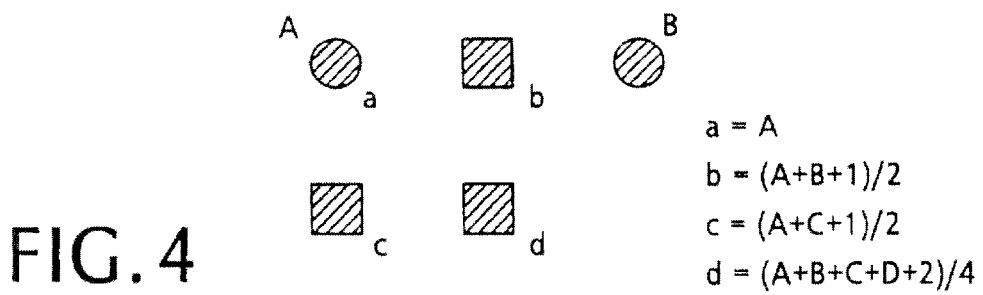
FIG. 4 shows bilinear half-pixel interpolation.

A full-search block match algorithm is performed between the coarse input field and the coarse representation of the reference field at the last level L, using an absolute difference distortion measure as the basis for matching. With an 8×8 block the minimum distortion, D, is the one found after exhaustive search in a search region $R_L$ of the coarse representation reference field. The minimum distortion is defined by:

$$D\left(\frac{n_x}{8}, \frac{n_y}{8}\right) = \min_{(d_{x,L} d_{y,L}) \in R_L} \sum_{i=0}^{8} \sum_{j=0}^{8}$$

$$\left| f_L\left(\frac{n_x}{8} + i, \frac{n_y}{8} + j, n_t\right) - f_L\left(\frac{n_x}{8} + i + d_{x,L}, \frac{n_y}{8} + j + d_{y,L}, n_t \pm T\right) \right|$$

where $d_L$ represents the displacement vector in the search region $R_L$ (defined by the grid $d_{x,L} \leq |N_{x,L}| \times d_{y,L} \leq |N_{y,L}|$) that minimizes D in the above equation. N is the size of the reference field at level L in the x or y direction, T denotes the temporal distance of the reference field from the input field, $f_L$ denotes the reference field at level L, and |.| is the absolute value. T negative indicates motion estimation in the forward direction (increasing in time) and T positive indicates motion estimation in the backward direction (decreasing in time). After finding the displacement vector at level L, a scaled version of the displacement vector is propagated to the next level L−1 of the pyramid. A new search is performed in a search region around the point $2d_L$. In general, the search region $R_{L-1}$ is smaller than the original search region $R_L$. This procedure is iterated to the base of the pyramid, i.e., to fields with the original size. The final motion vector can be described as $$v=(v_x, v_y)=2(d_{x,1}, d_{y,1})+(d_x, d_y) \text{ where } (d_x, d_y) \in R,$$

where $(d_x, d_y)$ is the displacement in R. The motion vector with integer pixel accuracy v is further refined to the half pixel accuracy shown in FIG. 4. The refinement is accomplished, for example by half-pel interpolating the reference field around motion vector v using a full-search block match in which nine positions are visited corresponding to $$v+\{(\pm\tfrac{1}{2},\pm\tfrac{1}{2}),(\pm\tfrac{1}{2},0),(0,\pm\tfrac{1}{2}),(0,0)\}.$$

Figure 5:
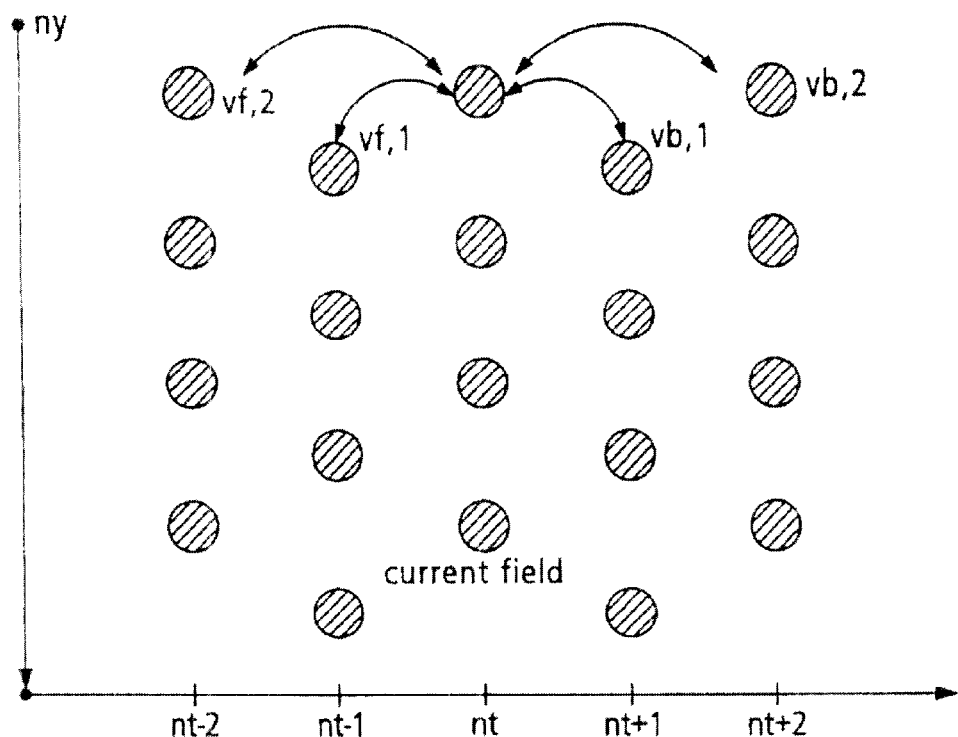
FIG. 5 shows vector field relationships.

Motion estimation is done between the input field $n_t$ and the temporally adjacent fields $n_t \pm 1$, and the two next earlier and the two next later fields, $n_t \pm 2$. When $T=\pm 1$, the fields with respect to which the motion estimation is done have different parity than the input field. If the input field is a top_field, the other two temporally adjacent fields are bottom_field type; if the input field is a bottom_field, the two temporally adjacent fields are top_field type. Conversely, when $T=\pm 2$, motion estimation is based on fields of the same parity as the input field. If the input (current) field is a top_field, the other fields are also top_field type. FIG. 5 shows the spatial-temporal relationship of the motion vector fields found by the hierarchical block match procedure. The forward motion vector fields are denoted as $v_{f,1}$ and $v_{f,2}$; the backward motion vector fields are denoted as $v_{b,1}$ and $v_{b,2}$.

The motion vectors fields can be described generally as $$v = [v_x, v_y]^T = \operatorname*{argmin}_{(d_x, d_y)} \sum_{(n_x, n_y) \in R} |f(n_x, n_y, t) - f(n_x - d_x, n_y - d_y, t \pm T)|,$$

with T defining the direction of motion as previously described.

The ranges of vector coordinate values used by the motion estimation algorithm for the different fields are shown in the following table.

| Pyramid Level | Field $n_1 - 2$ | Field $n_1 - 1$ | Field $n_1 + 1$ | Field $n_1 + 2$ |
|---|---|---|---|---|
| Original Size | $d_{x,1} \leq |3|$ and $d_{y,1} \leq |3|$ | $d_{x,1} \leq |3|$ and $d_{y,1} \leq |3|$ | $d_{x,1} \leq |3|$ and $d_{y,1} \leq |3|$ | $d_{x,1} \leq |3|$ and $d_{y,1} \leq |3|$ |
| L = 1 | $d_{x,1} \leq |4|$ and $d_{y,1} \leq |2|$ | $d_{x,1} \leq |16|$ and $d_{y,1} \leq |8|$ | $d_{x,1} \leq |16|$ and $d_{y,1} \leq |8|$ | $d_{x,1} \leq |4|$ and $d_{x,1} \leq |2|$ |

Next, the fields $n_t-1$ and $n_t+1$ are motion compensated using the vector fields denoted by $v_{f,1}$, $v_{f,2}$, $v_{b,1}$ and $v_{b,2}$ to find the best prediction of the missing line samples of the input field.

Post-processing of the Vector Fields

Unfortunately, motion compensating the $n_t-1$ field using the motion vector field $v_{f,1}$ will generate a field that when merged with the input field as a frame will produce jitter. The same is true if the $v_{b,1}$ motion vector field is used to motion compensate the $n_t+1$ field. This occurs because the motion vector fields $v_{f,1}$ and $v_{b,1}$ were derived from reference fields that where spatially displaced by one line from the input field. Similarly, the motion vector fields $v_{f,2}$ and $v_{b,2}$ are not suitable to motion compensate $n_t-1$ or $n_t+1$ respectively because these motion vector fields were derived from the input field and fields $n_t-2$ or $n_t+2$. Consequently, before the motion vector fields $v_{f,1}$, $v_{f,2}$, $v_{b,1}$ and $v_{b,2}$ are used for de-interlacing, they are post-processed.

Two new vector fields $v_f$ and $v_b$ are generated for use in motion compensating $n_t-1$ and $n_t+1$ respectively, based on the following conditions for the forward motion field and the backward motion field respectively.

if $((|v_{x,f,2}| \leq V_x)$ and $(|v_{y,f,2}| \leq V_y)$ and $(D_{f,2} \leq D_{f,1}+B_{SP}))$ $V_{xf}=v_{x,f}/2$; (*)  $V_{yf}=v_{x,f}/2$; (*)

else $V_{xf}=v_{x,f,1}$;

if (top_field)

$V_{y,f}=v_{y,f,1}+\frac{1}{2}$; (**)

else $V_{y,f}=v_{y,f,1}-\frac{1}{2}$; (**)

if $((|v_{x,b,2}| \leq V_x)$ and $(|v_{y,b,2}| \leq V_y)$ and $(D_{b,2} \leq D_{b,1}+B_{SP}))$ $V_{x,b}=v_{x,b,2}/2$;(*)  $V_{y,f}=v_{y,b,2}/2$; (*)

else $V_{x,b}=v_{x,b,1}$;

if (top_field)

$v_{y,b}=v_{y,b,1}+\frac{1}{2}$; (**)

else $V_{y,b}=v_{y,b,1}-\frac{1}{2}$; (**)

These rules establish the new set of vector fields denoted as $V_f$ and $V_b$. The (*) equations apply under an assumption of uniform motion, i.e., the displacement of 8×8 blocks in the forward and backward fields with the same parity in relation to the current field are small. This means that the ratio displacement over time can be considered as a constant.

The ()equations apply under an assumption of non-uniform motion of the vector fields and are used in large displacement cases where the assumption of uniform motion does not hold. The selection of which equations to use is based on vector thresholds $(V_x, V_y)$ and by considering the absolute value distortion comparison $D_f$ and $D_b$ in the equation for minimum distortion D, above. A small positive bias $B_{sp}$ is included for uniform motion. The () equations depend on the parity of the input field to accommodate the fact that motion estimation was performed on fields with opposite parity. The typical values of $(V_x, V_y)=(8.5, 4.5)$ in pixels, and $B_{sp}=128$.

Motion Compensation for De-interlacing

The vector fields $V_f$ and $V_b$ are used to form three types of motion compensated prediction: forward, backward and bi-directional, respectively defined as:

$f_f(n_x, n_y, n_t)=f(n_x-V_{f,x}, n_y-V_{f,y}, n_t-1)$;

$f_b(n_x, n_y, n_t)=f(n_x-V_{b,x}, n_y-V_{b,y}, n_t+1)$;

$f_{bd}(n_x, n_y, n_t)=[f_f(n_x, n_y, n_t)+f_b(n_x, n_y, n_t)]//2$.

where // denotes rounding towards zero.

Three main modes of motion compensation are defined—mc_mode, lp_mode, and blend_mode.

In mc_mode, an 8×8 block is formed purely by motion compensation prediction, i.e., forward, backward, or bi-directional. In lp_mode, the line doubling (vertical spatial interpolation) operation defined earlier forms an 8×8 block. In blend_mode, blending the motion compensated prediction field value with a pixel with the vertically interpolated pixel forms the pixels of an 8×8 block.

To reduce unreliable motion estimation, 8×8 blocks with poor interlaced motion compensation capability must be identified. To determine the motion compensation capability of the 8×8 blocks, two activity measures are defined for each 8×8 block—intrafield activity and interfield activity.

The intrafield activity measure is defined by $$A\left(\frac{n_x}{8}, \frac{n_y}{8}, n_t\right) = \sum_{j=0}^{6}\sum_{i=0}^{6} |f(n_x+i, n_y+j, n_t) - f(n_x+i+1, n_y+j, n_t)| + \sum_{i=0}^{6}\sum_{j=0}^{6} |f(n_x+i, n_y+j, n_t) - f(n_x+i, n_y+j+1, n_t)|.$$

The interfield activity measure is defined by $$fD_{mc}\left(\frac{n_x}{8}, \frac{n_y}{8}, n_t\right) = \sum_{i=0}^{7}\sum_{j=0}^{7} |f(n_x+i, n_y+j, n_t) - f_{mc}(n_x+i, n_y+j, n_t)|.$$

These intrafield and interfield activities are related by the first order approximation:

$fD_{mc} \approx \alpha A \pm \beta$ with $\alpha$ and $\beta$ denoting a scale factor and a bias respectively. There are three possible interfield activity measures, because the motion compensation prediction may be forward, backward, or bi-directional. If the intrafield 8×8 activity, A, is lower than any of the interfield 8×8 activities, $fD_f$, $fD_b$ and $fD_{bd}$, the block is assigned to the lp_mode, because good motion compensation should be associated with small interfield activity. The samples for such a block are obtained by vertical interpolation as suggested by the following pseudo code.

```
if ((fD_f > 3/2A) or (fD_b > 3/2A) or (fD_bd > 3/2A))
{
block_type = lp_mode;
}
else
{
block_type = to_be_defined;
```

The value of $\alpha$, 3/2, takes into account the ratio of absolute pixel differences evaluated by the interfield activity measure, with 96 absolute differences, with the 64 absolute pixel differences evaluated by the intrafield activity measure.

Figure 6:
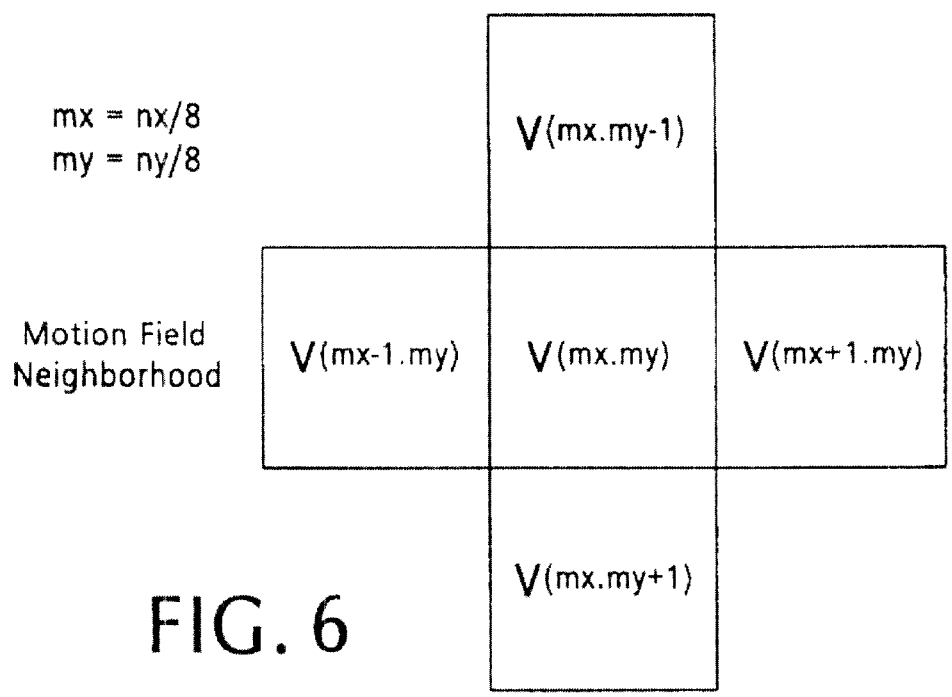
FIG. 6 shows motion field neighborhoods.

After segregating the lp_mode blocks, the remaining blocks are classified between blend_mode and mc_mode. The classification is done by computing the absolute motion vector differences between motion vectors of neighboring blocks and the motion vector of the central block of the neighborhood (shown in FIG. 6). If these differences are small enough when compared with a threshold the neighboring block is classified as providing a good motion compensation prediction.

There are four motion vector differences to be computed for the forward prediction, four differences for the backward prediction, and one difference to classify whether the block has a valid bi-directional prediction.

The use of these differences relies on the fact that backward and forward motion vectors should be anti-symmetric. Blocks for the same object should move with similar velocity. The intrafield and interfield activities can also play a role in this classification because intrafield activity is generally greater than interfield activities. The following pseudo code illustrates an example procedure for determining the differences and classifying a block in mc_mode or blend_mode.

$u = n_x/8; \; v = n_y/8;$

/* evaluate vector differences */

$dV_f[0] = |V_f(u, v) - V_f(u-1, v)|;$ $dV_f[1] = |V_f(u, v) - V_f(u, v-1)|;$ $dV_f[2] = |V_f(u, v) - V_f(u+1, v)|;$ $dV_f[3] = |V_f(u, v) - V_f(u, v+1)|;$ $dV_b[0] = |V_b(u, v) - V_b(u-1, v)|;$ $dV_b[1] = |V_b(u, v) - V_b(u, v-1)|;$ $dV_b[2] = |V_b(u, v) - V_b(u+1, v)|;$ $dV_b[3] = |V_b(u, v) - V_b(u, v+1)|;$ $dV_{bd} = |V_f(u, v) + V_b(u, v)|;$

/* threshold differences */ foward_flag 0;

backward_flag=0;

for(p=0; p<4; p++)

if$(dV_f[p] \leq VTHR)$ foward_flag++;

if$(dV_b[p] \leq VTHR)$ backward_flag++;

if((foward_flag==4) and (backward_flag<4) and $(dV_{bd} > VTHR))$ if$(df_f \leq (\alpha A - \beta))$ block_type=mc_mode;

else block_type=blend_mode;

else if((foward_flag<4) and (backward_flag==4) and $(dV_{bd} > VTHR))$ if$(fD_b \leq (\alpha A - \beta))$ block_type=mc_mode;

else block_type=blend_mode;

else if ((foward_flag==4) and (backward_flag==4) and $(dV_{bd} \leq VTHR))$ if$(fD_{bd} \leq (\alpha A - \beta))$ block_type=mc_mode;

else block_type=blend_mode;

else block_type=blend_mode;

The values of $\alpha$ and $\beta$ are respectively ⅔ and 128 with VTHR=(1.5, 1.5).

The mc_mode and blend_mode pixels classified by the procedure selected among three possibilities—forward, backward and bi-directional predicted pixels—by a temporal nonlinear selection suggested by the following pseudo code.

if(top_field) $dy=1$; else $dy=0;$ $a = f(n_x, n_y, n_t);$ $b = f(n_x, n_y+1, n_t);$ $c_f = f_f(n_x, n_y+dy, n_t);$ $c_b = f_b(n_x, n_y+dy, n_t);$ $c_b = f_b(n_x, n_y+dy, n_t);$ /* evaluate vertical spatial absolute differences */

$SSAD_f = |a - c_f| + |b - c_f|;$ (***)

$SSAD_b = |a - c_b| + |b - c_{bd}|;$ $SSAD_{bd} = |a - c_{bd}| + |b - c_{bd}|;$

Figure 7:
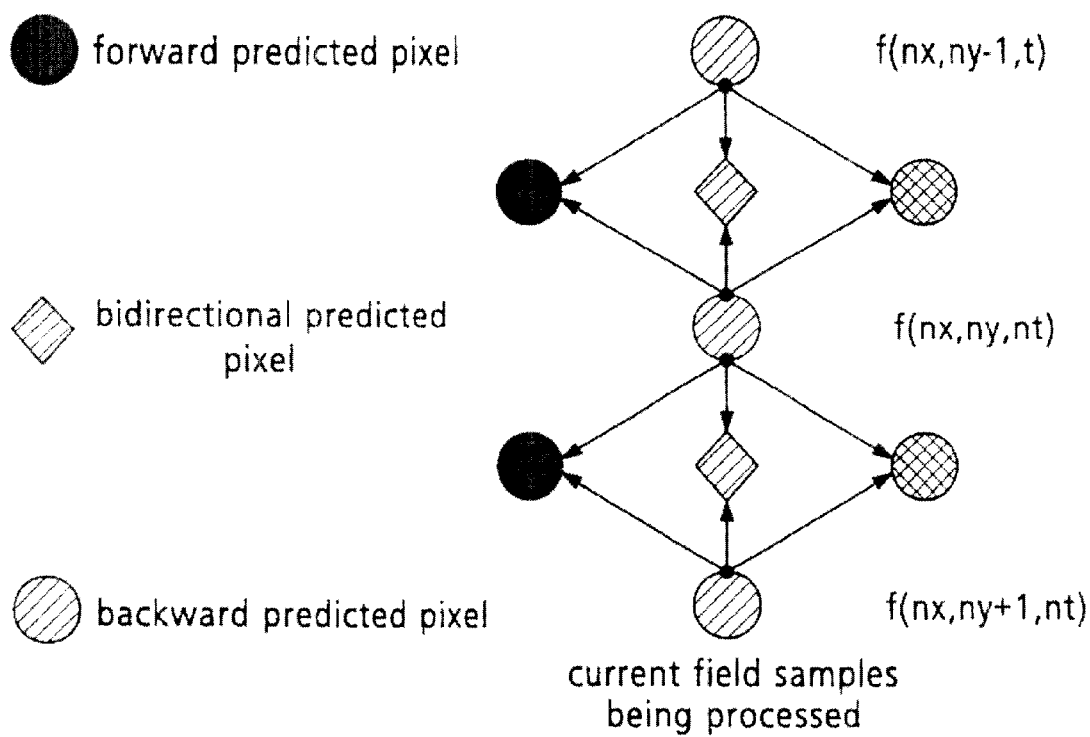
FIG. 7 shows temporal selection evaluation.

/* perform temporal selection */ if $((SSAD_{bd} \leq SSAD_f)$ and $(SSAD_{bd} \leq SSAD_b))$ $f_{mc}(n_x, n_y+dy, n_t) = c_{bd};$ else if $(SSAD_f \leq SSAD_b)$ $f_{mc}(n_x, n_y+dy, n_t) = c_f;$ else $f_{mc}(n_x, n_y+dy, n_t) = c_b;$ The temporal selection procedure is based on the pixels of the input field. The input pixel from the line above and the input pixel from line below are used in relation to the corresponding motion compensated temporal pixels. The three measures denoted as sums of spatial absolute differences, SSAD (marked with (***) in the pseudo code above) are evaluated and the temporal predicted pixel that yields the smallest distortion is used. In case of a tie in the distortion results, the order of preference is bi-directional predicted pixel, forward predicted pixel, and backward predicted pixel The goal is to maintain the predicted pixels that have the strongest correlation with vertical neighbors. The bias towards bi-directional prediction reflects the ability of these pixels to average out errors. The temporal selection pixel positioning is illustrated in FIG. 7.

Blending MC Pixels and Vertical Interpolated Pixels

We now describe the blend_mode that is used when the vertical interpolated or purely motion compensated pixels are not used individually, which occurs when the measured interfield activities and intrafield activity have a similar value.

For 8×8 blocks of the input field that are classified in blend_mode (because the interfield activities are close to the intrafield activity) the motion compensated block and the vertically interpolated block are blended. We can achieve this by defining a blend function which generates the output interpolated pixel field $f_i$ as follows.

$$f_i(n_x, n_y, n_t) - f_{mc}(n_x, n_y, n_t) + (\mu(|f_{ip}(n_x, n_y, n_t) - f_{mc}(n_x, n_y, n_t)|) + \delta)(f_{ip}(n_x, n_y, n_t) - f_{mc}(n_x, n_y, n_t))$$

Figure 9:
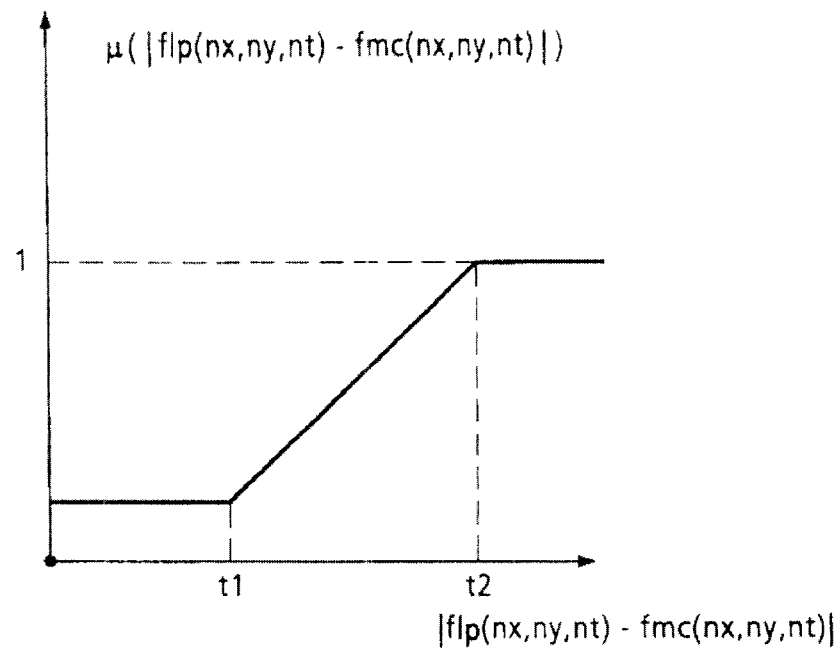
FIG. 9 shows an adaptive filtering coefficient function.

The adaptive filtering coefficient function (blending factor) $\mu(|f_{ip}(n_x, n_y, n_t) - f_{mc}(n_x, n_y, n_t)|)$ is illustrated in FIG. 9.

Figure 10:
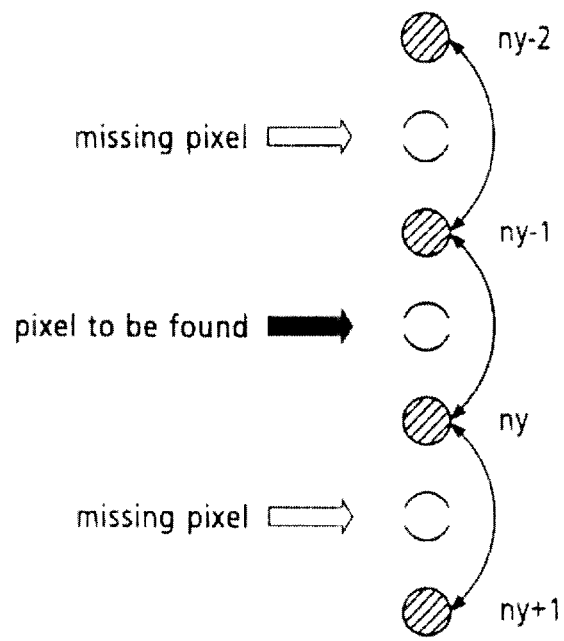
FIG. 10 shows pixel support for a calculation.

The $\delta$ value is an offset or bias to the vertically interpolated pixel that in general is taken to be zero. The threshold values $t_1$ and $t_2$ are adaptively chosen based on the input field. The threshold value $t_1$ is determined by the maximum vertical gradient in the two input field lines above and the two input field lines below the motion compensated interpolated pixel. Therefore the value $t_1$ can be written as $$t_1 = \max(|f(n_x, n_y-2, n_t) - f(n_x, n_y, n_t-1)|, |f(n_x, n_y, n_t-1) - f(n_x, n_y, n_t)|, |f(n_x, n_y, n_t) - f(n_x, n_y+1, n_t)|)^{-\tau}$$

where the value $\tau$ can be 0, 1, or 2. In simulations, the value of $\tau=1$ has been used. The pixel arrangement is shown on FIG. 10. The goal is to bias towards motion compensated predicted pixels since in general they offer better visual quality. This technique should also preserve vertical edges.

The difference between $t_1$ and $t_2$ is restricted to be a power of two between 1 and 32, so $$t_2 = t_1 + 2^n \text{ where } n=1, 2, 3, 4 \text{ or } 5.$$

Simulations suggest that the value n=4 offers a good tradeoff between spatial interpolation and motion compensation prediction.

The Overall Algorithm

Figure 12:
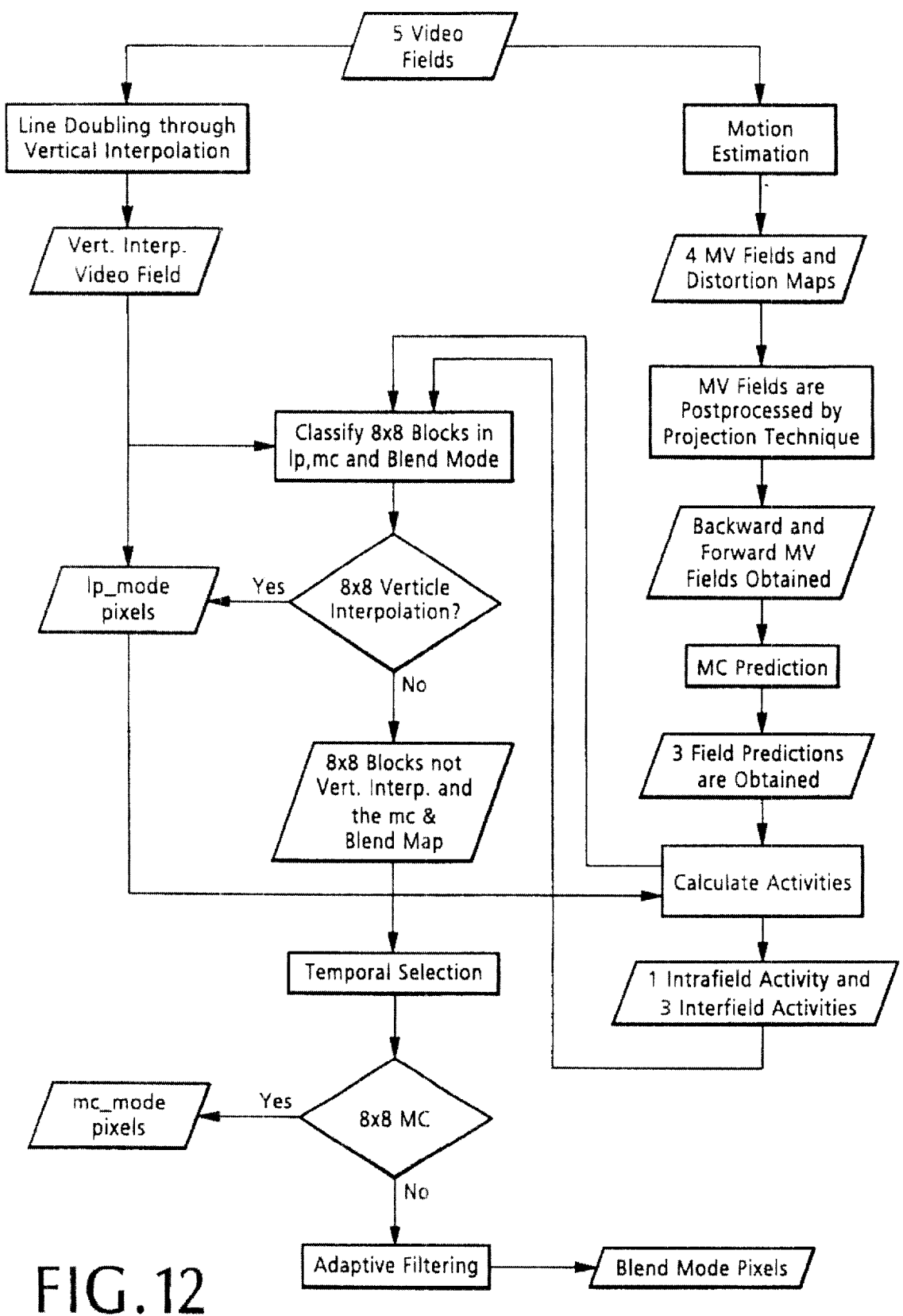
FIG. 12 is a flow chart of de-interlacing.

The overall flowchart of the de-interlacing algorithm is presented on FIG. 12. Each progressive output frame is derived from five input fields.

In the left side of the flowchart the line-doubled field is evaluated using vertical linear interpolation. In the right side, the motion compensation predictions are evaluated after finding the four motion vector fields through motion estimation. The motion vector fields are refined into two motion vector fields. The motion compensation predictions are forward, backward, and bi-directional. A purely motion compensated interpolated field is formed using the temporal selection mechanism. At the same time, four activity measures are computed for use with the two motion fields in the process of block classification. Each 8×8 interpolated field block is classified as purely vertical interpolated samples, purely motion compensated samples, or blended between the two modes.

The blend operation is performed by the adaptive filtering operation. In general, the interpolated field for typical video obtained through this process is composed of 90% motion compensated samples. 70% of these pixels are bi-directionally predicted. The blending operation originates eight percent of the pixels and the last two percent % are originated from the vertical interpolated field.

Finally, the lines of the interpolated field are merged into the current field to form the finished de-interlaced frame.

Processor

Implementation of the algorithm can be done using a programmed general purpose processor or a programmed special purpose video processor of the kind that is adapted to perform 8×8 pixel block computations rapidly. A block diagram of one such processor is shown in FIG. 13.

Figure 8:
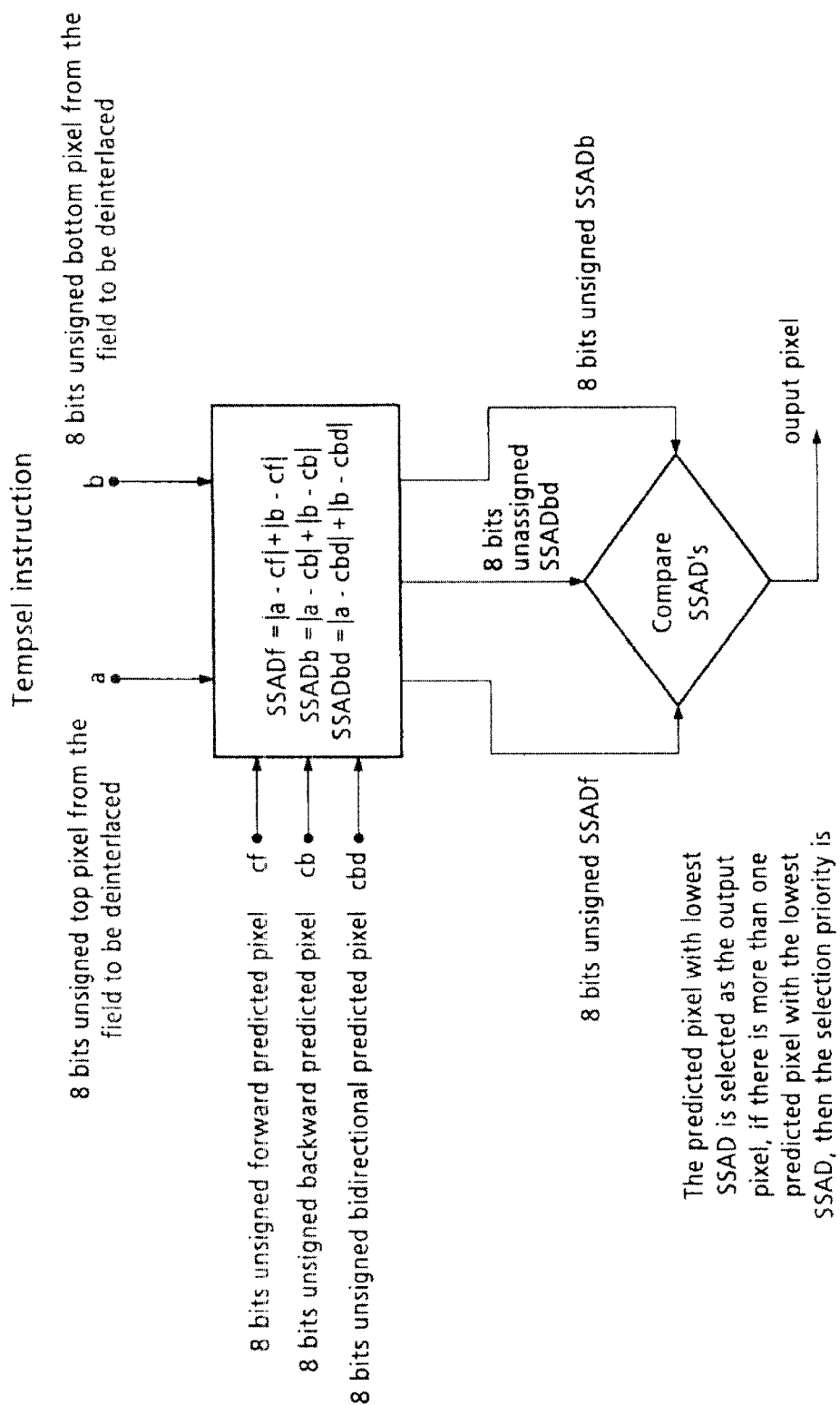
FIG. 8 shows a tempsel instruction.
Figure 11:
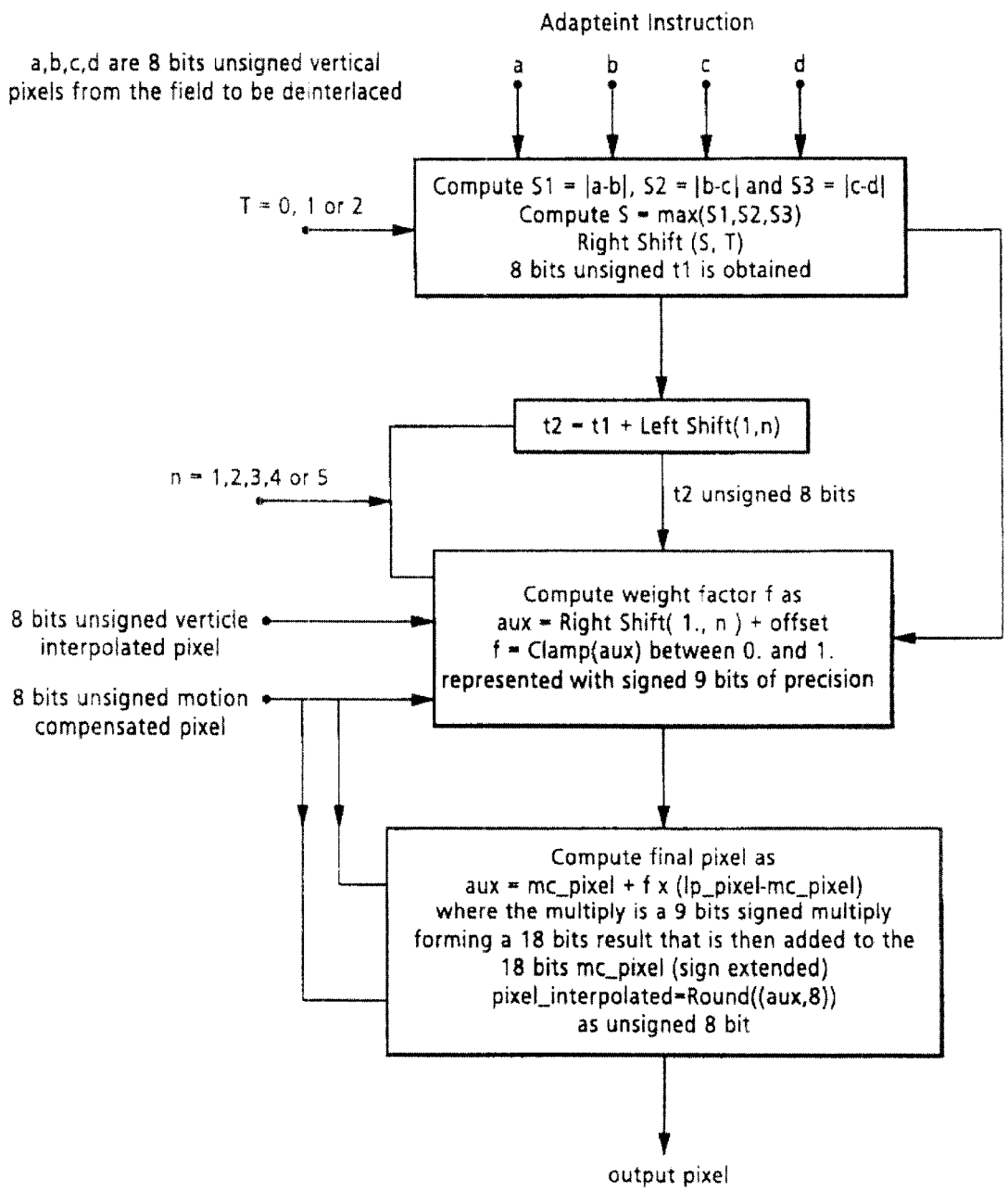
FIG. 11 shows an adapteint instruction.
Figure 13:
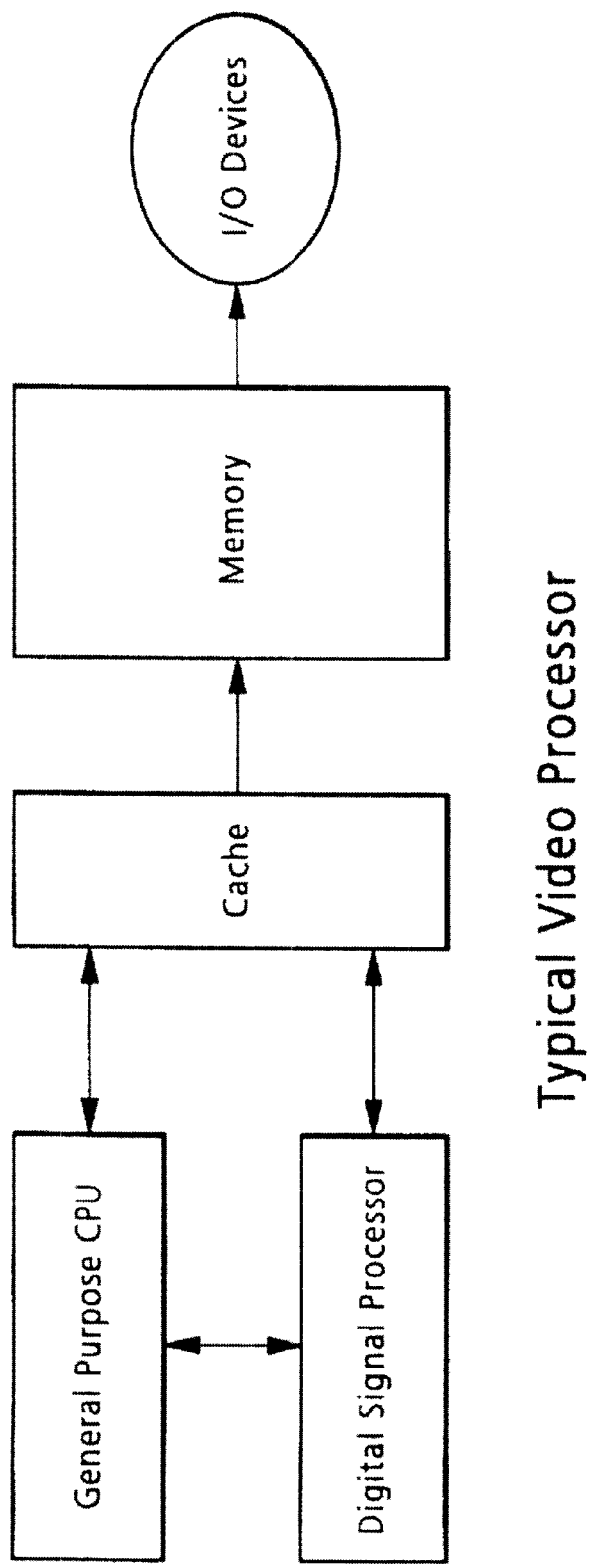
FIG. 13 is a block diagram of a video processor.

The instruction denoted as tempsel illustrated in FIG. 8 is a logical block of the Digital Signal Processor (DSP) presented on FIG. 13. This computing processor unit also performs the adapteint instruction of FIG. 11. The activity measures are also part of the of the DSP unit.

Other Embodiments

Other embodiments are within the scope of the following claims.

The performance (quality of the output video) of the algorithm can be enhanced using fine vector fields. For example, motion estimation with quarter pel interpolation accuracy can be applied in the stages of the motion estimation algorithm using filters with at least four taps, because two taps may be not enough for this kind of fine interpolation.

Also, the blend_mode pixels computation, which is based on the mc block pixels that have close intrafield and interfield activities and on the vertical interpolated pixels, could be enhanced. Instead of performing the later interpolation in the single current field, this interpolation could take into account the previous and/or the next field using a linear combination of pixels. This approach can yield high order correction to the mc predicted pixels.

In addition, early in the algorithm (even before the motion estimation step), the activity measure and a single distortion measure (referenced to the past field) both as defined in the text, can be used for still scene change detection for pictures with high spatial activity. These scenes generally happen in zone plates with and without noise. In this case, the visually correct interpolation process is achieved by vertical interpolation because motion estimation cannot be performed accurately.

What is claimed is:

1. A method for de-interlacing a temporal sequence of fields of video data comprising the steps of:
   (A) performing a motion estimation for a source video field and a plurality of temporally adjacent video fields of said video data to provide a plurality of motion vector fields;
   (B) processing said motion vector fields to produce a plurality of second motion vector fields;
   (C) performing a motion compensation to said source video field in response to said second motion vector fields; and
   (D) interpolating said source video field to produce a vertically interpolated video field prior to performing said motion compensation.

2. The method according to claim 1, wherein step (A) comprises the sub-step of performing a full-search block motion estimation within a reference field.

3. The method according to claim 2, wherein said reference field has a lower resolution than said source video field.

4. The method according to claim 1, wherein said plurality of temporally adjacent video fields are at least four temporally adjacent video fields.

5. The method according to claim 1, wherein said motion vector fields comprise (i) a plurality of forward motion vector fields and (ii) a plurality of backward motion vector fields produced by a hierarchical block match procedure.

6. The method according to claim 1, wherein said second motion vector fields comprise (i) a forward vector field and (ii) a backward vector field usable in motion compensation prediction.

7. The method according to claim 1, wherein step (B) comprises the sub-steps of:

processing said motion vector fields by a first set of equations in response to a first condition; and processing said motion vector fields by a second set of equations in response to a second condition.

8. The method according to claim 7, wherein step (B) further comprises the sub-steps of:

selecting between said first condition and said second condition in response to a plurality of vector thresholds.

9. The method according to claim 1, wherein step (C) comprises the sub-step of forming a plurality of motion compensation predictions in response to said second motion vector fields.

10. The method according to claim 9, wherein said motion compensation predictions comprise (i) a forward motion compensation prediction, (ii) a backward motion compensation prediction, and (iii) a bi-directional motion compensation prediction.

11. The method according to claim 1, wherein step (C) comprises the sub-step of forming a plurality of motion compensation predictions in response to processing said motion vector fields.

12. The method according to claim 11, further comprising the step of selecting between (i) said vertically interpolated video field and (ii) said motion compensation predictions prior to performing said motion compensation.

13. The method according to claim 12, wherein the step of selecting comprises the sub-step of identifying blocks of pixels within said vertically interpolated video field having a good interlaced motion compensation capability.

14. The method according to claim 13, further comprising the step of selecting between (i) said motion compensation predictions and (ii) a plurality of blends of said motion compensation predictions and said vertically interpolated video field in response to identifying said blocks of pixels.

15. A method for de-interlacing a temporal sequence of fields of video data comprising the steps of:

(A) generating a vertically interpolated video field from a source video field of said video data using a line doubling interpolation process;

(B) performing a motion estimation on said source video field and a plurality of temporally adjacent video fields of said video data to provide four motion vector fields;

(C) processing said motion vector fields to provide two additional motion vector fields;

(D) calculating a plurality of motion compensation predictions from said two additional motion vector fields;

(E) computing an activity measure for each of said motion compensation predictions and said vertically interpolated video field;

(F) classifying blocks of pixels among a plurality of modes in response to said activity measures;

(G) selecting an interpolated pixel field from among said modes; and (H) merging said interpolated pixel field into said source video field to provide a de-interlaced frame.

16. The method according to claim 15, wherein step (F) comprises the sub-step of classifying said blocks of pixels into (i) a line doubling mode, (ii) a motion compensated mode, and (iii) a blended mode.

17. The method according to claim 15, wherein said motion compensation predications comprise (i) a forward motion compensation prediction, (ii) a backward motion compensation prediction, and (iii) a bi-directional motion compensation prediction.

18. The method according to claim 15, further comprising the step of blending a block of pixels within said vertically interpolated video field with another block of pixels within said motion compensation predictions to provide a blended block of pixels.

19. A method for de-interlacing a temporal sequence of fields of video data comprising the steps of:

(A) performing a motion estimation for a source video field and a plurality of temporally adjacent video fields of said video data to provide a plurality of motion vector fields;

(B) performing a full-search block motion estimation within a reference field, wherein said reference field has a lower resolution than said source video field;

(C) processing said motion vector fields to produce a plurality of second motion vector fields; and (D) performing a motion compensation to said source video field in response to said second motion vector fields.

* * * * *